United States Patent [19]
Stine et al.

[11] Patent Number: 5,546,823
[45] Date of Patent: Aug. 20, 1996

[54] HIGH-CAPACITY COMPOUND TRANSMISSION

[75] Inventors: Alan C. Stine, Kalamazoo; Joseph D. Reynolds, Climax, both of Mich.

[73] Assignee: Eaton Corporation, Cleveland, Ohio

[21] Appl. No.: 345,092

[22] Filed: Nov. 28, 1994

Related U.S. Application Data

[63] Continuation-in-part of Ser. No. 063,792, May 20, 1993, Pat. No. 5,390,561, and Ser. No. 63,829, May 20, 1993, Pat. No. 5,370,013.

[51] Int. Cl.⁶ .................................. F16H 3/08; F16H 3/04
[52] U.S. Cl. .................................. 74/331; 74/333
[58] Field of Search .................. 74/325, 329, 331, 74/333

[56] References Cited

U.S. PATENT DOCUMENTS

| | | | |
|---|---|---|---|
| 3,817,123 | 6/1974 | Whateley et al. | 74/331 X |
| 4,226,135 | 10/1980 | Winter | 74/330 |
| 4,375,171 | 3/1983 | Morscheck | 74/331 |
| 4,375,172 | 3/1983 | Richards et al. | 74/331 X |
| 4,627,301 | 12/1986 | Bainbridge et al. | 74/333 |
| 4,735,109 | 4/1988 | Richards et al. | 74/331 X |
| 4,754,665 | 7/1988 | Vandervoort | 74/745 |
| 4,802,375 | 2/1989 | Stodt | 74/331 |
| 4,831,894 | 5/1989 | Braun | 74/331 |
| 4,876,924 | 10/1989 | Fletcher et al. | 74/331 X |
| 4,944,197 | 7/1991 | Stine et al. | 74/477 |
| 5,370,013 | 12/1994 | Reynolds et al. | 74/331 X |
| 5,390,561 | 2/1995 | Stine | 74/331 |

*Primary Examiner*—Khoi Q. Ta
*Attorney, Agent, or Firm*—Howard D. Gordon

[57] ABSTRACT

A high-capacity compound transmission (200) of lighter weight and/or shorter axial length than comparable prior art transmissions is provided. The compound transmission of the present invention utilizes main and auxiliary section countershafts (324, 362) which are coaxial and define a countershaft assembly supported solely by bearings in the transmission housing (214) forward and rearward end walls (214A, 214B) and by a single bearing carried by a minimal intermediate housing wall (214C). The mainshaft (346) is supported solely by tapered surfaces at the forward and rearward ends thereof, which abut complimentary tapered surfaces on or carried by the rearward end of the input shaft (16) and forward end of the output shaft (358). The auxiliary countershafts (362) may be generally tubular (362D) to allow for rear mounting of main section-driven PTO devices.

19 Claims, 9 Drawing Sheets

FIG.1
PRIOR ART

| RATIO NO. | HIGH RANGE | LOW RANGE |
|---|---|---|
| 16 | 0.86 | |
| 15 | 1.00 | |
| 14 | 1.16 | |
| 13 | 1.35 | |
| 12 | 1.56 | |
| 11 | 1.82 | |
| 10 | 2.10 | |
| 9 | 2.46 | |
| 8 | | 2.84 |
| 7 | | 3.36 |
| 6 | | 3.88 |
| 5 | | 4.54 |
| 4 | | 5.25 |
| 3 | | 6.12 |
| 2 | | 7.07 |
| 1 | | 8.26 |
| Lo | | 13.08 |
| LoLo | | 15.17 |

FIG. 4B

| RATIO NO. | MAIN SECTION GEAR ENGAGED TO MAINSHAFT | GEAR ENGAGED BY CLUTCH 126 | GEAR ENGAGED BY CLUTCH 128 |
|---|---|---|---|
| LoLo | 56 | 120 | 124 |
| Lo | 56 | 118 | 124 |
| 1 | 54 | 120 | 124 |
| 2 | 54 | 118 | 124 |
| 3 | 52 | 120 | 124 |
| 4 | 52 | 118 | 124 |
| 5 | 50 | 120 | 124 |
| 6 | 50 | 118 | 124 |
| 7 | 24 | 120 | 124 |
| 8 | 24 | 118 | 124 |
| 9 | 54 | 120 | 120 |
| 10 | 54 | 118 | 120 |
| 11 | 52 | 120 | 120 |
| 12 | 52 | 118 | 120 |
| 13 | 50 | 120 | 120 |
| 14 | 50 | 118 | 120 |
| 15 | 24 | 120 | 120 |
| 16 | 24 | 118 | 120 |
| $R_{LO}$ | 58 | 120 | 124 |
| $R_H$ | 58 | 120 | 120 |

FIG. 4C

HIGH-CAPACITY COMPOUND TRANSMISSION

RELATED APPLICATIONS

This application is related to and is a continuation-in-part of U.S. patent application Ser. No. 08/063,792, entitled COMPOUND TRANSMISSION, now U.S. Pat. Nos. 5,390,561 and 5,370,013, respectively, and U.S. patent application Ser. No. 08/063,829, both filed May 20, 1993 entitled HELICALLY GEARED COMPOUND TRANSMISSION, both assigned to the same assignee, EATON CORPORATION, as this application.

BACKGROUND OF THE INVENTION

1. Field of the Invention

The present invention relates to an improved high-capacity compound mechanical change gear transmission structure, preferably for vehicular compound transmissions of the multiple substantially identical countershaft type. In particular, the present invention relates to an improved high-capacity compound mechanical transmission structure allowing, for a given transmission capacity and life, the provision of a lighter, axially shorter and/or less costly transmission as compared to comparable prior art high-capacity transmission structures.

2. Description of the Prior Art

Compound change gear transmissions, usually vehicular transmissions for heavy duty vehicles, of the type having one or more auxiliary sections connected in series with a main transmission section are well known in the prior art. Briefly, by utilizing main and auxiliary transmission sections connected in series, assuming proper sizing of the ratio steps, the total of available transmission ratios is equal to the product of the main and auxiliary section ratios. By way of example, at least in theory, a compound change gear transmission comprising a four (4) forward speed main section connected in series with a three (3) speed auxiliary section will provide twelve (4×3=12) available forward ratios.

Auxiliary transmission sections are of three general types: range type, splitter type or combined range/splitter type.

In compound transmissions having a range type auxiliary section, the auxiliary section ratio step or steps are greater than the total ratio coverage of the main transmission section ratios used in both ranges and the main section is shifted progressively through its ratios in each range. Examples of compound transmissions having range type auxiliary sections may be seen by reference to U.S. Pat. Nos. 3,105,395; 2,637,222 and 2,637,221, the disclosures of which are hereby incorporated by reference.

In compound transmissions having a splitter type auxiliary section, the ratio steps of the splitter auxiliary section are less than the ratio steps of the main transmission section and each main section ratio is split, or subdivided, by the splitter section. Examples of compound change gear transmissions having a splitter type auxiliary sections may be seen by reference to U.S. Pat. Nos. 4,290,515; 3,799,002; 4,440,037 and 4,527,447, the disclosures of which are hereby incorporated by reference.

In a combined range and splitter type auxiliary section, or sections, both range and splitter type ratios are provided allowing the main section to be progressively shifted through its ratios in at least two ranges and also allowing one or more of the main section ratios to be split in at least one range.

One example of a compound transmission having a single combined range/splitter type auxiliary section may be seen by reference to U.S. Pat. Nos. 3,283,613; 3,648,546, the disclosures of which are hereby incorporated by reference. Another example is the "Ecosplit" model of transmission sold by Zahnradfabrik Friedrichshafen Aktiengeseushaft of Friedrichshafen, Federal Republich of Germany which utilizes a separate splitter auxiliary section in front of, and a separate range auxiliary section behind, the main transmission section.

Another example of a compound vehicular transmission having a single combined three gear layer, four-speed combined splitter/range transmission may be seen by reference to U.S. Pat. Nos. 4,754,665 and 4,944,197, the disclosures of which are incorporated herein by reference.

It should be noted that the terms main and auxiliary sections are relative and that if the designations of the main and auxiliary sections are reversed, the type of auxiliary section (either range or splitter) will also be reversed. In other words, given what is conventionally considered a four-speed main section with two-speed range type auxiliary section, if the normally designated auxiliary is considered the main section, the normally designated main section would be considered a four-speed splitter type auxiliary section therefor. By generally accepted transmission industry convention, and as used in this description of the invention, the main transmission section of a compound transmission is that section which contains the largest (or at least no less) number of forwards speed ratios, which allows selection of a neutral position, which contains the reverse ratio(s) and/or which is shifted (in manual or semiautomatic transmissions) by manipulation of a shift bar or shift rail or shift shaft/shift finger assembly as opposed to master/slave valve/cylinder arrangements or the like.

The prior art compound change gear transmissions, especially the prior art compound transmissions of the type having both range and splitter type auxiliary section gearing, such as the "Roadranger" type and "Super 10" type offered by Eaton Corporation and the "Ecosplit" type offered by Zahnradfabrik Friedrichshafen Aktiengeseushaft, are well received and widely used in manually shifted heavy duty vehicles. However, these and other types of prior art compound change gear transmissions are not totally satisfactory as it is an ongoing objective, especially for vehicular transmissions, to provide transmissions of equal or improved capacities and reliability which use fewer parts and/or are axially shorter and/or lighter in weight as compared to prior art transmissions of comparable capacity and reliability.

Aforementioned co-pending, allowed U.S. patent application Ser. Nos. 08/063,792 and 08/063,829, now U.S. Pat. Nos. 5,390,561 and 5,370,013, respectively, both assigned to the assignee of this application, disclosed transmissions of an improved structure which use fewer parts and/or are axially shorter and/or of a lighter weight as compared to comparable prior art compound transmissions of equivalent capacity and reliability. This was accomplished by providing a compound transmission wherein (i) the main and auxiliary section countershafts form a coaxial assembly of countershafts supported solely by bearings in the front and rear end walls of the transmission housing, preferably one of the main and auxiliary section countershafts extend from the forward to the rearward housing end walls and the other of the countershafts is a generally tubular member surrounding and rotationally supported on the one countershaft and/or (ii) the mainshaft is supported, preferably in a radially floating manner, solely by the input and/or output shafts without intermediate bearings journalled in an intermediate housing wall. The above structure eliminated the requirement of all or a large portion of the intermediate housing wall(s) and the various shaft support bearings associated therewith which allowed the provision of compound change gear transmissions of relatively lighter weight, shorter axial length and/or fewer parts as compared to comparable prior art transmissions.

While the above-described improved transmission structure is an advancement in the art, to provide a compound transmission having a relatively equal or greater reliability and large capacity, such as greater than 1,400 pound-feet of input shaft torque, without providing some intermediate support for the countershaft assemblies required an undesirable increase in transmission center distances (the distance between the axes of rotation of the input shaft/main shaft/output shaft and the countershaft assemblies) and/or diameters of the countershafts.

SUMMARY OF THE INVENTION

In accordance with the present invention, a high-capacity compound transmission is provided which utilizes substantially fewer parts and/or is axially shorter and/or of a lighter weight as compared to comparable prior art compound transmissions of equivalent capacity and reliability. The foregoing is accomplished in a high-capacity compound transmission by utilizing (i) main and auxiliary section countershafts which form a coaxial assembly of countershafts each supported solely by bearings in the front and rear end walls of the transmission housing and by a single bearing in a relatively small intermediate wall and/or (ii) a mainshaft which is supported, preferably in a radially floating manner, solely by the input and/or output shafts without intermediate bearings journalled in an intermediate housing wall. The above structure eliminates the requirement of a large portion of the intermediate housing wall(s) and various shaft support bearings associated therewith which allows the provision of high-capacity compound change gear transmissions of relatively lighter weight, shorter axial length and/or fewer parts as compared to comparable prior art transmissions.

Accordingly, it is an object of the present invention to provide a new and improved high-capacity compound change gear transmission.

This and other objects and advantages of the present invention will become apparent from a reading of the detailed description of the preferred embodiment taken in connection with the attached drawings.

DESCRIPTION OF THE DRAWINGS

FIG. 1 is a schematic illustration of a prior art high-capacity compound transmission.

FIGS. 4A, 4B, and 4C are schematic illustrations of the shift pattern, typical ratios and clutch positions for the transmissions of FIGS. 1 and 3.

DESCRIPTION OF THE PREFERRED EMBODIMENT

Figure 1:
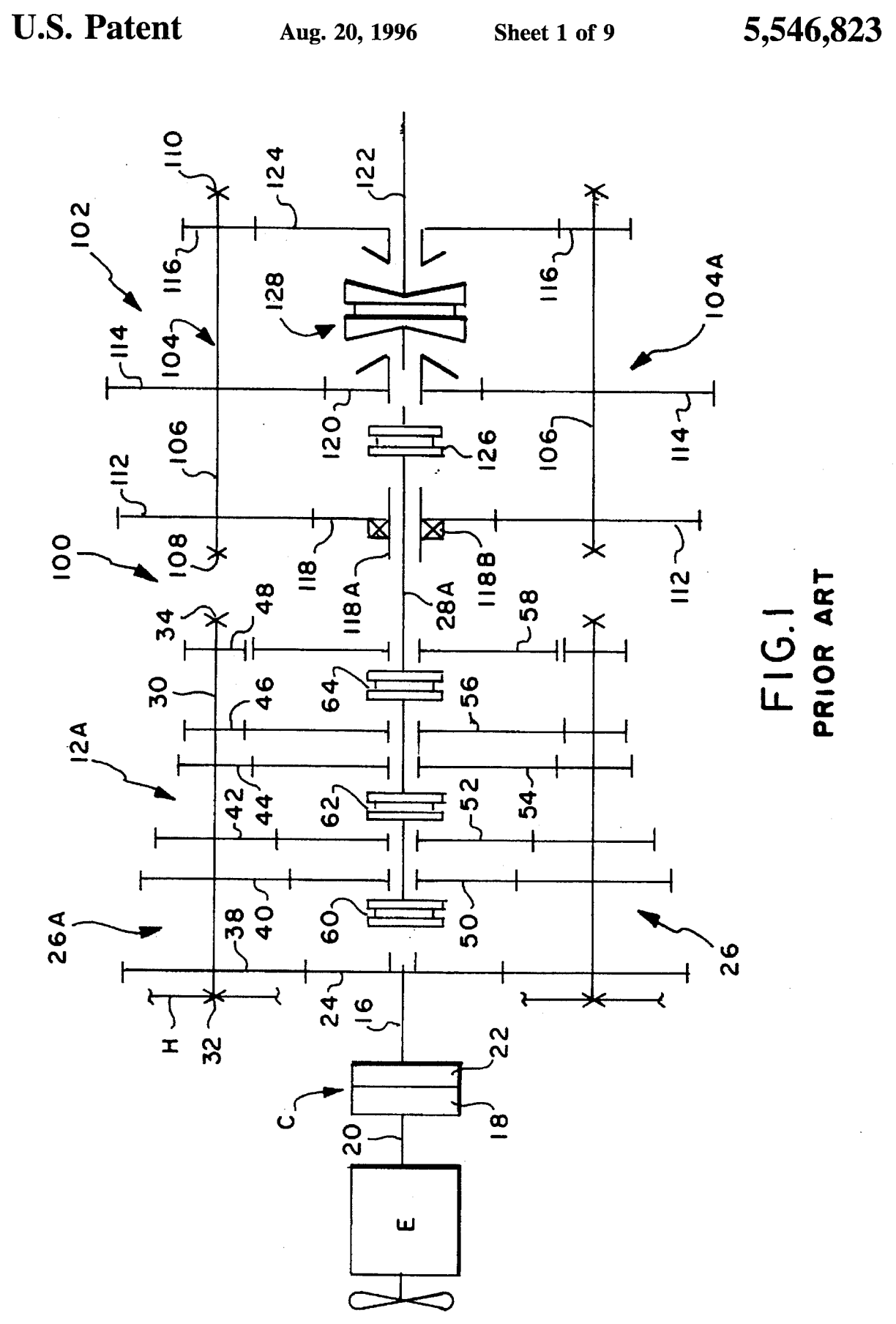
Figure 2A:
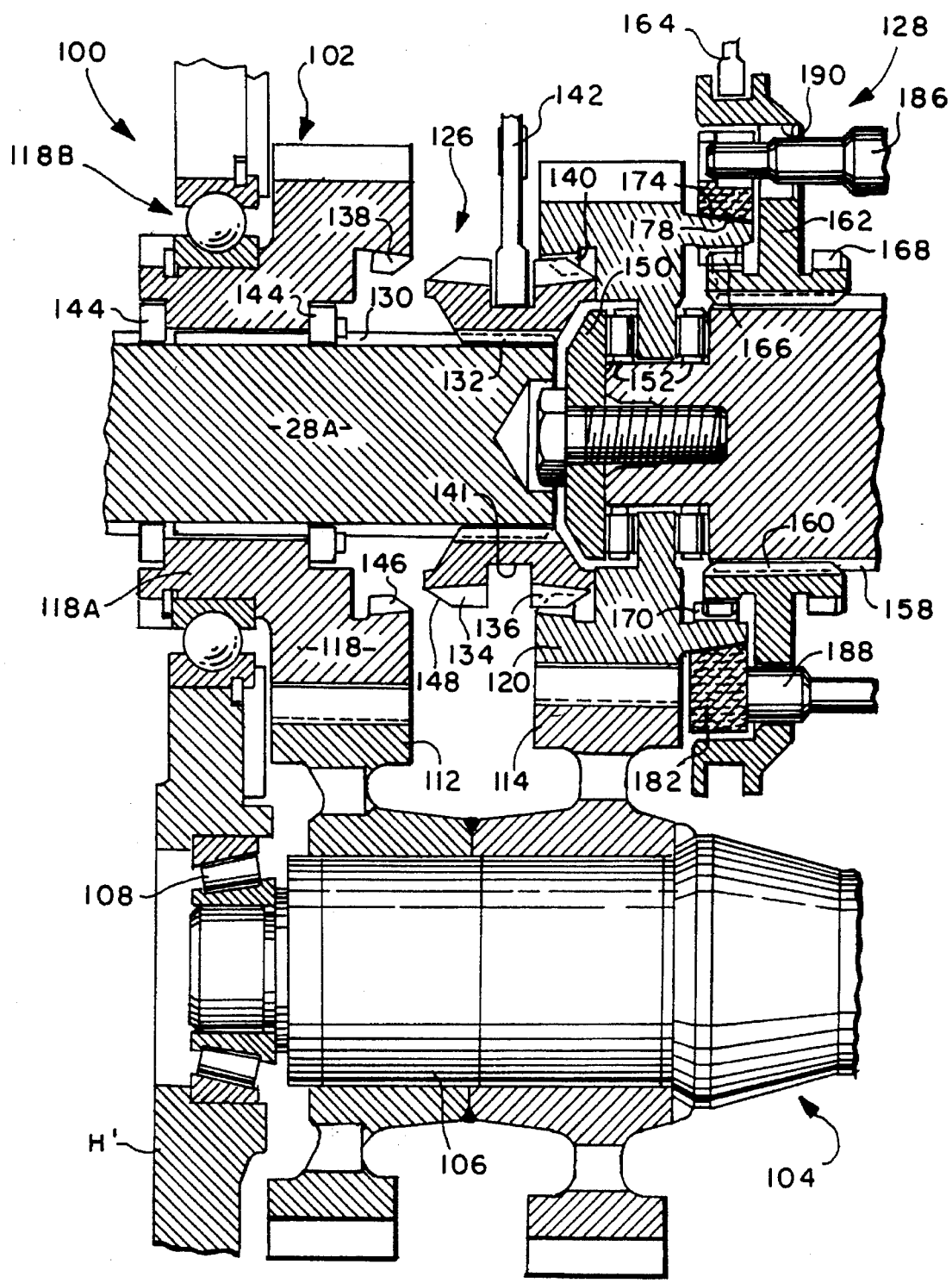
FIGS. 2A and 2B are sectional views of the auxiliary section of the transmission of FIG. 1.

Certain terminology in the following description will be used only for convenience and will not be limiting. The words "upwardly," "downwardly," "rightwardly" and "leftwardly" will designate directions in the drawings to which reference is made. The words "forward" and "rearward" will refer, respectively, to the front and rear ends of the transmission as conventionally mounted in the vehicle, being respectively to the left and right sides of the transmission as illustrated in FIG. 1. The words "inwardly" and "outwardly" will refer to directions toward and away from, respectively, the geometric center of the device and designated parts thereof. Said terminology includes the words specifically mentioned above, derivatives thereof and words of similar import.

The term "compound transmission" is used to designate a change speed or change gear transmission having a main transmission section and an auxiliary transmission section connected in series whereby the selected gear reduction in the main transmission section may be compounded by further selected gear reduction in the auxiliary transmission section. The term "upshift" as used herein shall mean the shifting from a lower speed gear ratio to a higher speed gear ratio. The term "downshift" as used herein shall mean the shifting from a higher speed gear ratio to a lower speed gear ratio. The terms "low speed gear" or "low gear" as used herein shall designate a gear ratio utilized for relatively lower forward speed operation in a transmission, i.e., a set of gears having a higher ratio of reduction of output shaft speed relative to the speed of the input shaft. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation and relative large capacity friction means are associated with the clutch members and are sufficient, upon initiation of a clutch engagement, to cause the clutch members and all members rotating therewith to rotate at a substantially synchronous speed.

Referring now to FIG. 1, there is schematically illustrated a well known and highly commercially successful 18-speed compound transmission 100. Transmission 100 comprises a main transmission section 12A connected in series with an auxiliary transmission section 102 having both range and splitter type gearing. Typically, transmission 100 is housed within a single housing and includes an input shaft 16 driven by a prime mover such as diesel engine E through a selectively disengaged, normally engaged master friction clutch C having an input or driving section 18 drivingly connected to the engine crank shaft 20 and a driven portion 22 rotatably fixed to the transmission input shaft 16.

In the main transmission section 12A, the input shaft 16 carries an input gear 24 for simultaneously driving a plurality of substantially identical main section countershaft assemblies 26 and 26a at substantially identical rotational speeds. In the transmission 100 illustrated, two substantially identical main section countershaft assemblies are provided on diametrically opposite sides of a mainshaft 28A, which mainshaft is generally coaxially aligned with the input shaft 16. Each of the main section countershaft assemblies 26 and 26a comprises a main section countershaft 30 supported by bearings 32 and 34 in housing H, only a portion of which is schematically illustrated. Each of the main section countershafts 30 is provided with an identical grouping of main section countershaft gears 38, 40, 42, 44, 46 and 48, fixed for rotation therewith. A plurality of main section drive or mainshaft gears 50, 52, 54, 56 and 58 surround the mainshaft 28A and are selectively clutchable, one at a time, to the mainshaft 28A for rotation therewith by sliding clutch collars 60, 62 and 64, as is well known in the art. Clutch collar 60 also may be utilized to clutch input gear 24 to mainshaft 28A to provide a direct drive relationship between input shaft 16 and mainshaft 28A.

Preferably, each of the main section mainshaft gears encircles the mainshaft 28A and is in continuous meshing engagement with and is floatingly supported by the associated countershaft gear group, which mounting means and a special advantages resulting therefrom are explained in greater detail in U.S. Pat. Nos. 3,105,395 and 3,335,616, the disclosures of which are hereby incorporated by reference. Typically, clutch collars 60, 62 and 64 are axially positioned by means of shift forks (not illustrated) associated with a shift bar housing assembly (not illustrated), as is well known in the prior art. Clutch collars 60, 62 and 64 are of the well known nonsynchronized double acting jaw clutch type.

Main section mainshaft gear 58 is the reverse gear and is in continuous meshing engagement with countershaft gears 48 by means of conventional intermediate idler gears (not shown). It also should be noted that while main transmission section 12A does provide five selectable forward speed ratios, the lowest forward speed ratio, namely, that ratio provided by drivingly connected mainshaft drive gear 56 to mainshaft 28, is often of such a high gear reduction as to be considered a low or "creeper" gear which is utilized only for starting of a vehicle under severe conditions and is usually not utilized in the high transmission range and/or may not be split in the low transmission range. Accordingly, while the main section 12 illustrated does provide five forward speeds, it is usually referred to as a "4+1" main section, as only four of the forward speeds are compounded by the auxiliary transmission section 14.

Jaw clutches 60, 62 and 64 are 3-position clutches in that they may be positioned in a centered, non-engaged position, as illustrated, or in a fully rightwardly engaged or fully leftwardly engaged position.

Auxiliary transmission section 102 includes two substantially identical auxiliary countershaft assemblies 104 and 104A, each comprising an auxiliary countershaft 106 supported by bearings 108 and 110 in housing H and carrying three auxiliary section countershaft gears 112, 114 and 116 fixed for rotation therewith. Auxiliary countershaft gears 112 are constantly meshed with and support auxiliary section splitter gear 118 which surrounds mainshaft 28A. Auxiliary countershaft gears 114 are constantly meshed with and support auxiliary section splitter/range gear 120 which surrounds the output shaft 122 at the end thereof adjacent the coaxial end of mainshaft 28A. Auxiliary section countershaft gears 116 constantly mesh and support auxiliary section range gear 124, which surrounds the output shaft 122. Accordingly, auxiliary section countershaft gears 112 and splitter gear 118 define a first gear layer, auxiliary section countershaft gears 114 and splitter/range gear 120 define a second gear layer, and auxiliary section countershaft gears 116 and range gear 124 define a third layer or gear group of the combined splitter and range type auxiliary transmission section 102.

A sliding 2-position jaw clutch collar 126 is utilized to selectively couple either the splitter gear 118 or the splitter/range gear 120 to the mainshaft 28A, while a two position synchronized assembly 128 is utilized to selectively couple the splitter/range gear 120 or the range gear 124 to the output shaft 122. The structure and function of double acting sliding jaw clutch collar 126 is substantially identical to the structure and function of sliding clutch collar 96 utilized in connection with transmission 10 while the structure and function of double acting synchronized clutch assembly 128 is substantially identical to the structure and function of synchronized clutch assembly 92 utilized in connection with transmission 10. Synchronized clutch assemblies such as assemblies 92 and 128 are well known in the prior art and examples thereof may be seen by reference to U.S. Pat. Nos. 4,462,489; 4,125,179 and 2,667,955, the disclosures of all of which are incorporated by reference.

It is noted that gear 118 defines a forwardly extending hub 118A for receipt of a bearing 118B supported in the intermediate housing wall H'. Bearing 118B provides an intermediate support for the mainshaft 28A.

Figure 2B:
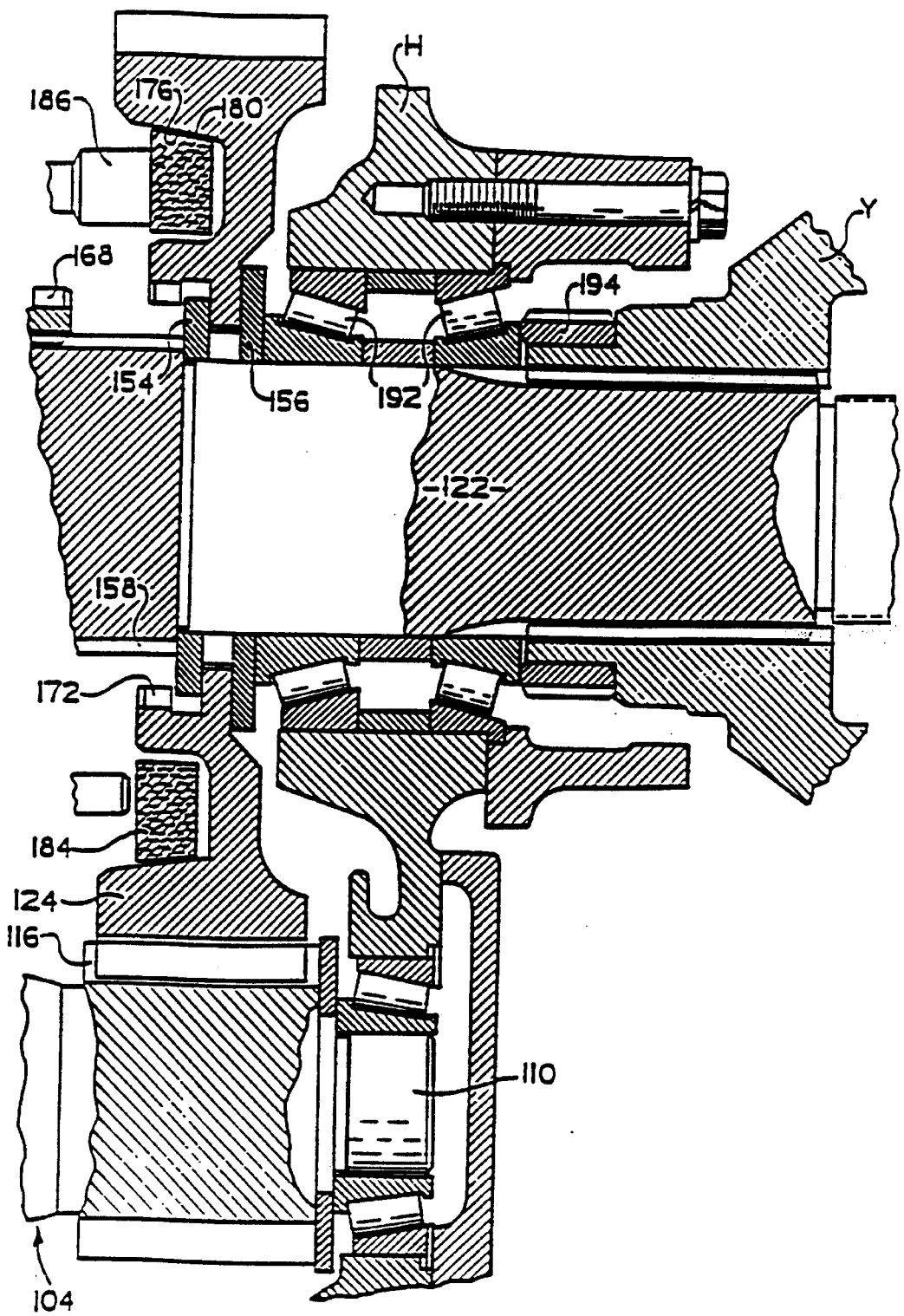

The detailed structure of auxiliary section 102 is illustrated in FIGS. 2A and 2B, wherein it may be seen that the rearward end of mainshaft 28A extending into the auxiliary transmission section 102 is provided with external splines 130, which mate with internal splines 132 provided on clutch collar 126 for rotationally coupling clutch collar 126 to the mainshaft 28A while allowing relative axial movement therebetween. The clutch collar 126 is provided with clutch teeth 134 and 136 for selective axial engagement with clutch teeth 138 and 140 provided on gears 118 and 120, respectively. The clutch collar 126 is also provided with a groove 141 for receipt of a shift fork 142.

Gear 118 surrounds mainshaft 28A and is normally free to rotate relative thereto and is axially retained relative to the mainshaft 28A by means of retainers 144. Clutch teeth 136 and 138 present tapered surfaces 146 and 148 which are inclined at about 35° relative to the axis of the mainshaft 28A which provides an advantageous interaction tending to resist nonsynchronous engagement and further tending to cause a synchronous rotation, as is described in greater detail in U.S. Pat. No. 3,265, 173, the disclosure of which is hereby incorporated by reference. Clutch teeth 136 and 140 are provided with similar complementary tapered surfaces. Hub 118A of gear 118 receives bearing 118B which is received in the intermediate housing wall H', as is countershaft support bearing 108.

Splitter/range gear 120 is rotatably supported at the inward end 150 of output shaft 122 by means of a pair of thrust bearings 152 while range gear 124 surrounds the output shaft 122 and is axially retained thereon by means of thrust washers 154 and 156. Located axially between gears 120 and 124 and rotationally fixed to output shaft 122 by means of external splines 158 and internal splines 160, is the double-acting 2position synchronized clutch assembly 128. Many of the well-known synchronized positive clutch structures are suitable for use in the auxiliary transmission section of the present invention. The synchronized clutch assembly 128 illustrated is of the pin type described in above mentioned U.S. Pat. No. 4,462,489. Briefly, the synchronized clutch assembly 128 includes a slidable jaw clutch member 162 axially positioned by a shift fork 164 and carrying clutch teeth 166 and 168, respectively, for axial engagement with clutch teeth 170 and 172, respectively, carried by gears 120 and 124, respectively. Gears 120 and 124 define cone friction surfaces 174 and 176, respectively, for frictional synchronizing engagement with matching frictional cone surfaces 178 and 180, respectively, carried by the friction rings 182 and 184, respectively, of the synchronized clutch assembly. Blocker pins 186 and 188 are rotationally fixed to the friction rings 184 and 182, respectively, and interact with blocker openings 190 carried by the sliding member 162 to provide the blocking function, as is well known in the prior art. Synchronizing assembly 128 also may include a plurality of spring pins (not shown) for providing initial engagement of the conical friction surfaces at the initiation of a clutch engagement operation.

Output shaft 122 is supported by bearings 192 in housing H and extends therefrom for attachment of a yoke member Y or the like which typically forms a portion of a universal joint for driving a propeller shaft to a differential or the like. The output shaft 122 may also carry a speedometer gear 194 and/or various sealing elements (not shown).

By selectively axially positioning both the splitter clutch 126 and the range clutch 128 in the forward and rearward axial positions thereof, four distinct ratios of main shaft rotation to output shaft rotation may be provided. Accordingly, auxiliary transmission section 102 is a 3-layer auxiliary section of the combined range and splitter type providing four selectable speeds or drive ratios between the input (countershaft 28A) and output (output shaft 122) thereof. The main section 12A provides a reverse and five potentially selectable forward speeds. However, one of these selectable forward gear ratios (gear 56) is often a creeper or low gear not intended to be used in the high range. Thus, transmission 100 is properly designated as a (4+1)×(2)×(2) type transmission providing 17 or 18 selectable forward speeds, depending upon the desirability and/or practicality of splitting the low or creeper gear.

Figure 4A:
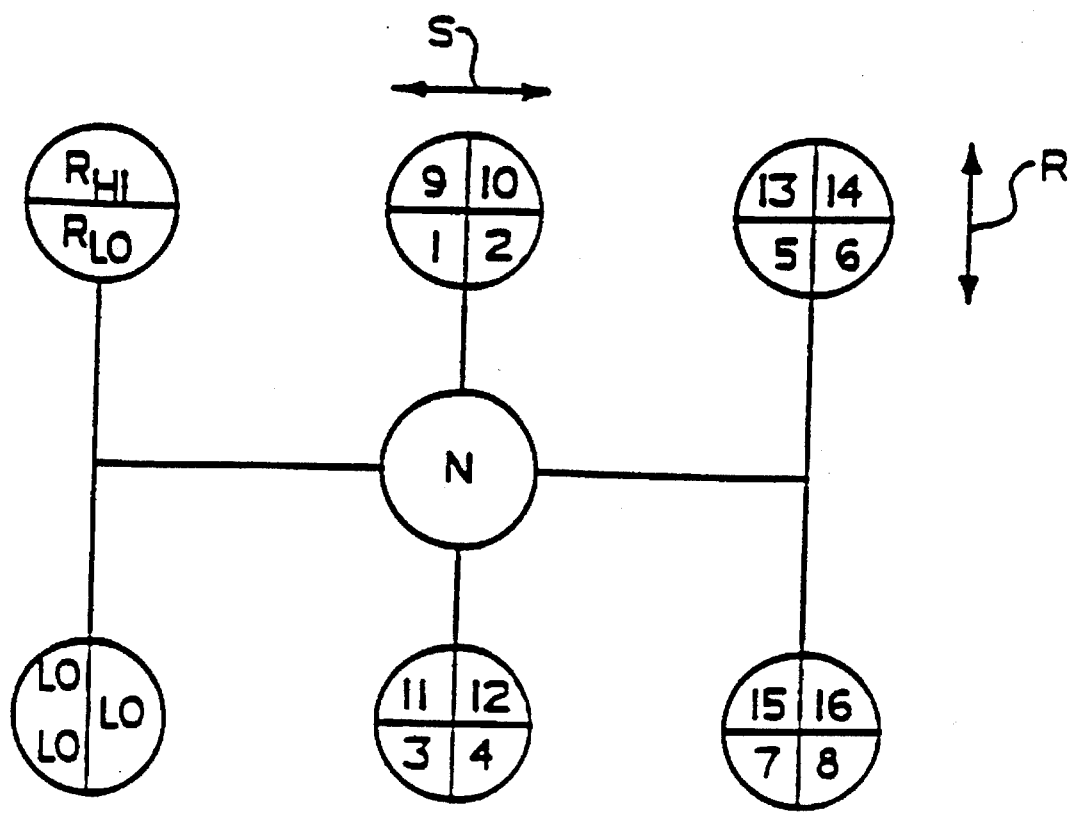

While clutch 128 (the range clutch) should be a synchronized clutch, double-acting clutch collar 126 (the splitter clutch) is not required to be synchronized. Of course, one or both of the clutches defined by collar 126 could be of the synchronized type. The shift pattern for shifting transmission 100 is schematically illustrated in FIG. 4A, where divisions in the vertical direction illustrate range shifts, while divisions in the horizontal direction illustrate splitter shifts.

A method of selecting desirable gear ratios is schematically illustrated by reference to FIG. 4B. Disregarding the creeper (illustrated in dashed lines) and reverse ratios, and assuming that it is desirable that a transmission have generally equal ratio steps, the main section ratio steps should be generally equal, the splitter step should be generally equal to the square root of the main section ratio steps, and the range step should equal about the main section ratio step raised to the N power where N equals the number of main section ratio steps occurring in both ranges (i.e., N=4 in the (4+1)×(2)×(2) transmission). Given the desired ideal ratios, gearing to approximate these ratios is selected.

Assuming by way of example that gears 118, 120, 124, 112, 114 and 116, respectively, have 40, 38, 54, 41, 45 and 19 teeth each, respectively, the following four auxiliary section ratios are obtainable:

(1) Clutch 126 engaged to gear 120 and clutch 128 engaged to gear 124 provides an auxiliary section reduction of about 3.365:1;

(2) Clutch 126 engaged to gear 118 and clutch 128 engaged to gear 124 provides an auxiliary section reduction of about 2,913:1;

(3) Clutch 126 engaged to gear 120 and clutch 128 engaged to gear 120 provides an auxiliary section reduction about 1,000:1; and (4) Clutch 126 engaged to gear 118 and clutch 128 engaged to gear 120 provides an auxiliary section reduction of about 0.865:1.

In the foregoing example, the splitter steps are about 15.6%, while the range step is about 336.6%, which is generally suitable for a "4+1"main transmission section having about 35% steps, as the square root of 1.35equals about 1.16, and 1.35 raised to the fourth power (i.e., N=4) equals about 3.32. FIG. 4C illustrates the various gears engaged for the various selectable forward speeds of transmission 100. It is noted that 8–9 and 9–8 shifts are extremely complex because both a main section shift and a combined range and splitter auxiliary section shift are required.

Figure 3:
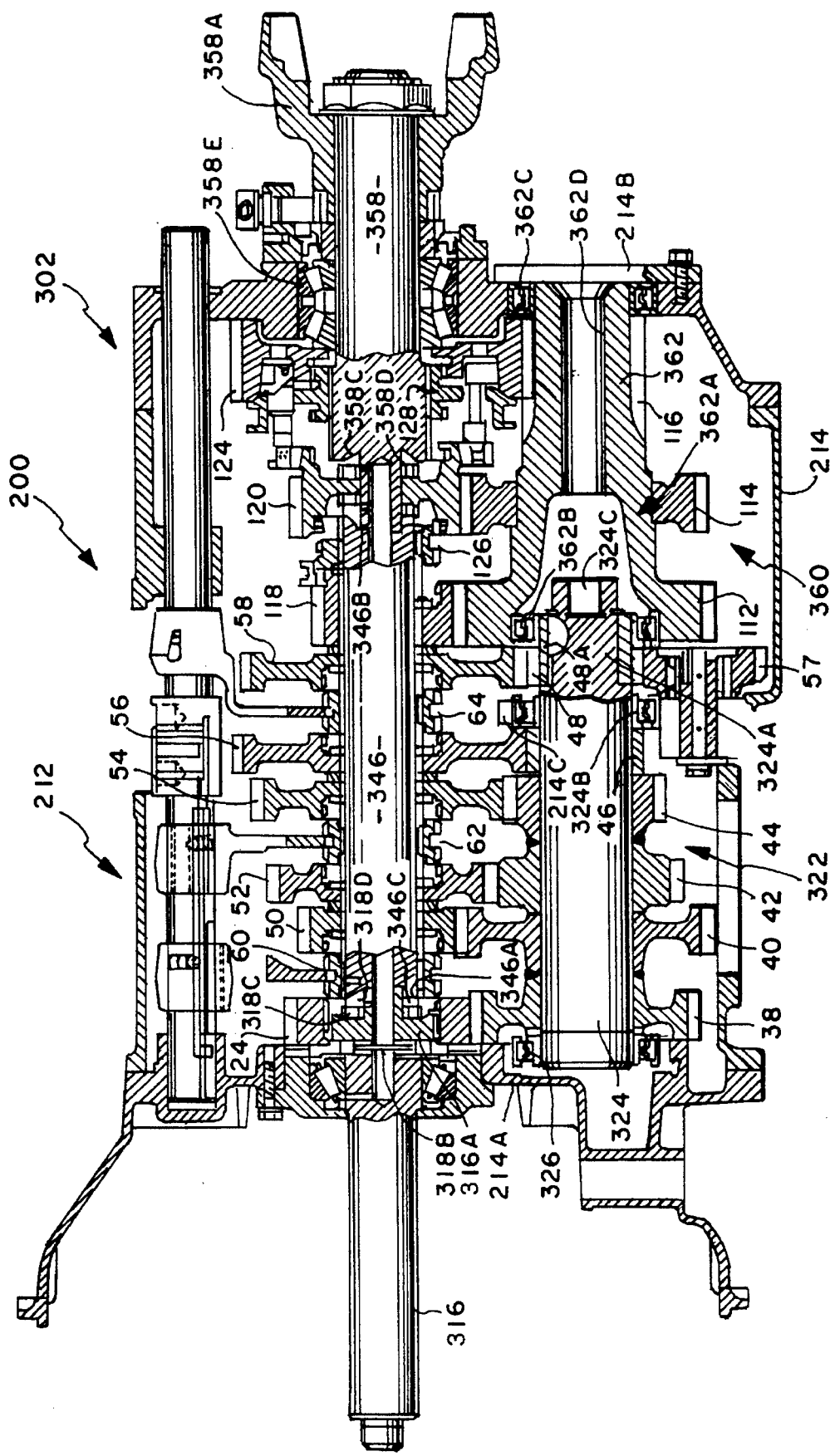
FIG. 3 is a sectional view of a preferred embodiment of the high-capacity compound transmission of the present invention.
Figure 3A:
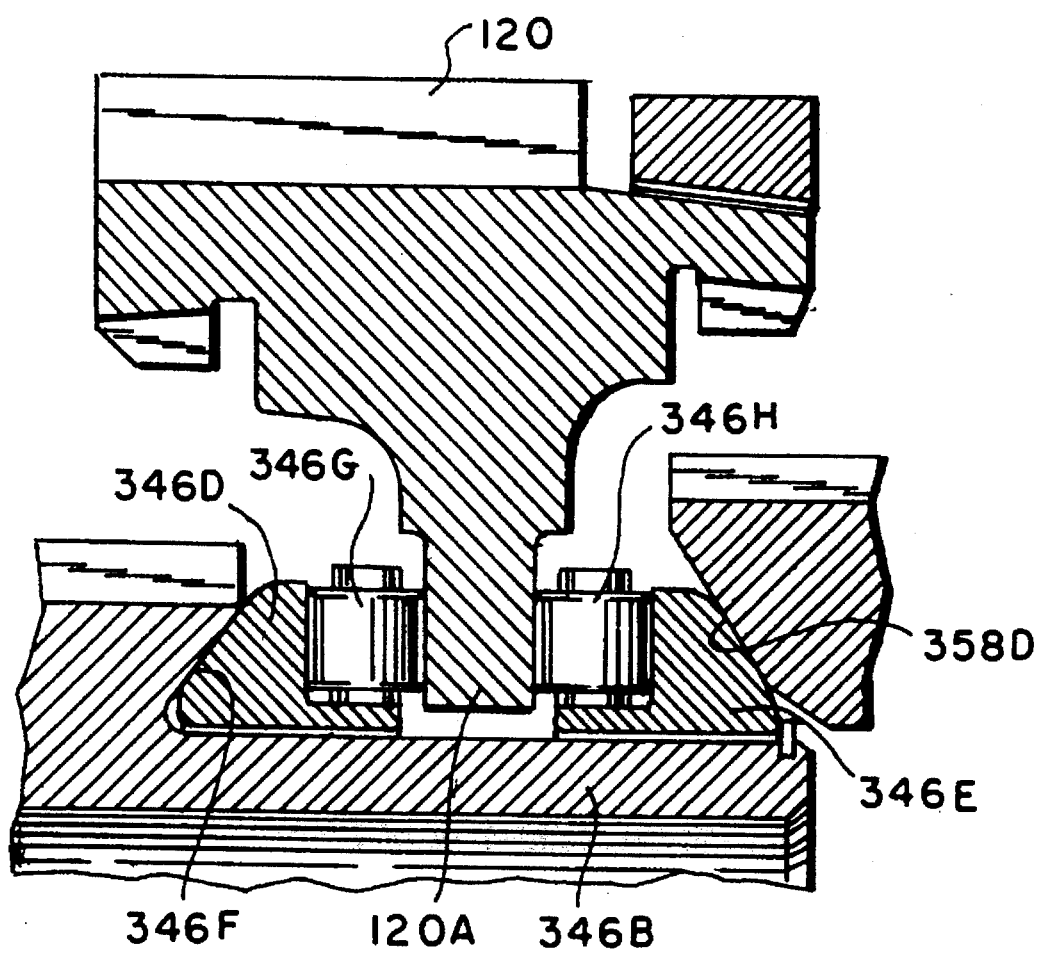
FIG. 3A is an enlarged sectional view of a portion of the transmission of FIG. 3.
Figure 3B:
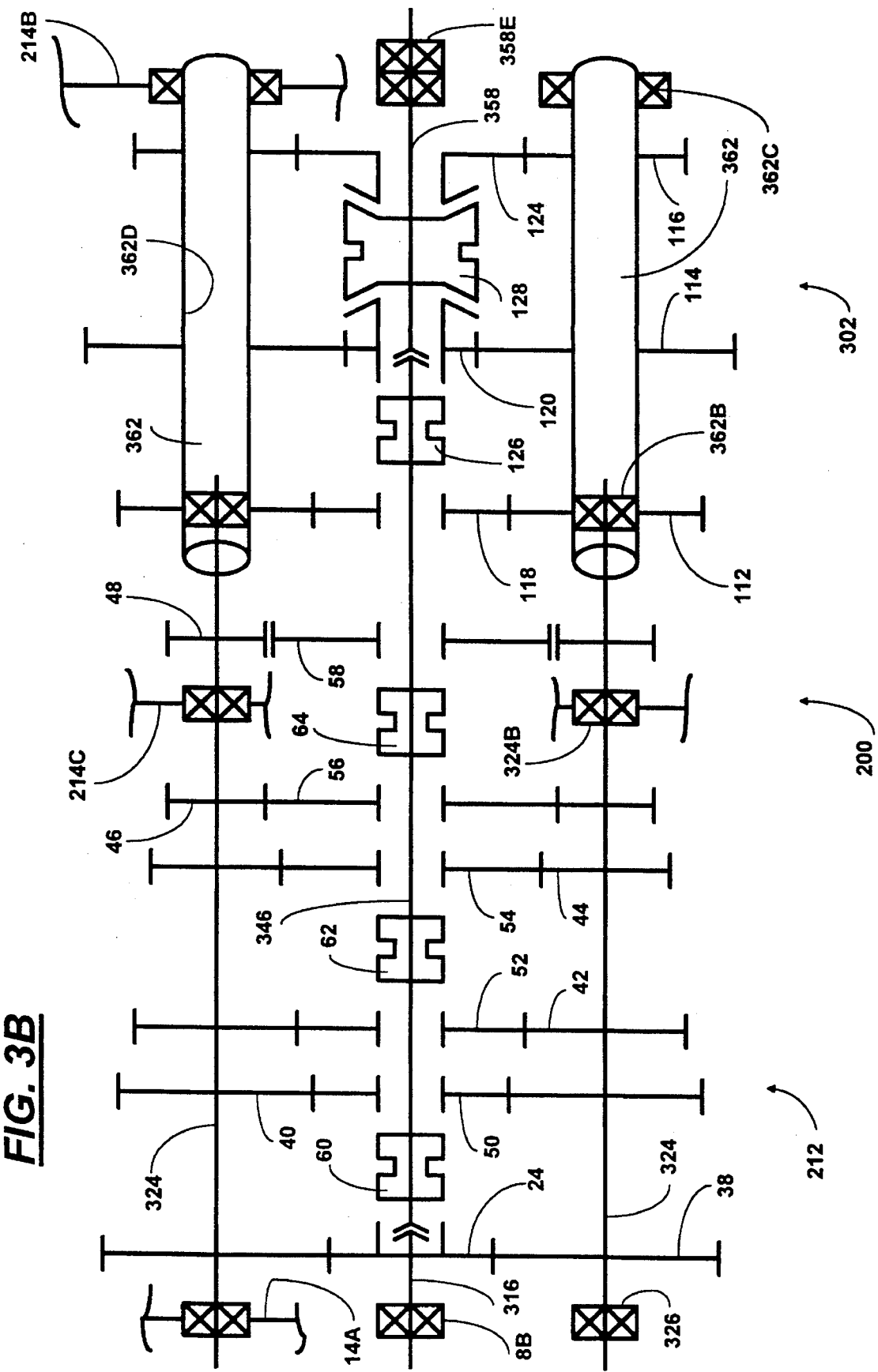
FIG. 3B is a schematic illustration of the transmission of FIG. 3.

A preferred embodiment of the present invention, high-capacity compound transmission 200, is illustrated in FIGS. 3, 3A and 3B Transmission 200 includes a main section 212 and an auxiliary section 302 which, except as noted, are functionally identical to main section 12A and auxiliary section 102, respectively, described above. The shift pattern of FIG. 4A, the ratio chart of FIG. 4B and the truth table of FIG. 4C are applicable to both the prior art transmission 100 and the preferred embodiment of the present invention transmission 200.

Elements of transmission 200 which are substantially functionally and structurally identical to elements of transmission 100 will be assigned like reference numerals and will not be redescribed in detail.

Transmission 200 is a "(4+1)×(2)×(2)" type compound transmission wherein the main section 212 and auxiliary section 302 are contained within a common housing 214 having a forward end wall 214A, a rearward end wall 214B and a partial intermediate end wall 214C.

Input shaft 316 carries input gear 24 fixed for rotation therewith and defines an inwardly extending reduced diameter portion 316A which directly or indirectly supports the front end 346A of mainshaft 346. Output shaft 358 extends from the rear end of transmission 20 and carries splines for receipt of an output flange 358A. The inner end 358C of output shaft 358 is provided with an inwardly and rearwardly tapered surface 358D for direct or indirect support of the rear end 346B of mainshaft 346. Input shaft 318 is supported in front end wall 316A by taper roller bearing 318B while output shaft 358 is supported in rear end wall 316B by dual taper roller bearing assembly 358E.

The mainshaft 346 carries mainshaft clutches 60, 62 and 64 and the splitter clutch 126, and extends generally coaxially between and is supported by the inner ends of the input and output shafts. Mainshaft gears 50, 52, 54, 56 and 58, splitter gear 118 and splitter/range gear 120 surround the mainshaft, preferably for limited radial movement relative thereto, and are selectively clutchable thereto by clutches 60, 62, 64 and 126. Range clutch 128 is carried by output shaft 358 which is surrounded by splitter/range gear 120 and range gear 124. Clutch 128 is effective to clutch either gear 120 or gear 124 to the output shaft 358. The function and operation of transmission 200 is the same as that of transmission 100, discussed above.

The countershaft assemblies 322 and 360, respectively, are substantially functionally and operatively identical to the mainsection and auxiliary countershaft assemblies 26 and 104 of transmission 100, described above. Briefly, mainsection countershaft(s) 324 carries countershaft gears 38, 40, 42, 44, 46 and 48 fixed thereto, which are constantly meshed with and/or support, mainshaft gears 50, 52, 54 and 56 and, through reverse idler gear 57, mainshaft gear 58. Auxiliary countershaft(s) 362 carries auxiliary countershaft gears 112, 114 and 116, which are constantly meshed with splitter, splitter/range and range gears 112, 114 and 116, respectively. The forward ends 362A of the auxiliary countershaft(s) 362 are generally tubular and telescopically surround the rear end 324A of the mainsection countershafts and are directly or indirectly rotatably supported by bearings 362B thereon.

A bearing 326 supports the forward end of main section countershaft 324 in front wall 214A, while a bearing 362C supports the rearward end of auxiliary section countershaft 362 in the rear end wall 214B. The rearward end 324A of main section countershaft 324 is supported by bearing 324B in partial intermediate wall 214C, while the forward end 362A of auxiliary countershaft 362 is supported by bearing 362B, carried by a cantilevered rearward end 324D of main countershaft 324. Preferably, reverse countershaft gear 48 carries a rearwardly extending hub 48A for carrying bearing 362B.

The auxiliary section countershafts 362 are preferably of a tubular structure defining a through bore 362D, allowing the use of rear-mounted, main section countershaft-driven PTO devices. For that purpose, the rearward end 324A of the main section countershaft 324 may be provided with a driving socket 324C or the like.

The reduced diameter extension 316A of the input shaft 316 carries an axial roller bearing 318C and a generally spherical washer 318D of bearing steel, which will abut a generally complimentary radially inwardly and axially rearwardly tapered surface 346C provided on the front end 346A of the mainshaft 346.

As may be seen by reference to FIG. 3A, the hub portion 120 of range/splitter gear 120 surrounds the reduced diameter rearward portion 346B of the mainshaft 346 which also carries two spherical washers 346D and 346E, structurally identical to washer 318D, which interact with generally complimentary inclined surfaces 346F on the mainshaft and 358D on the output shaft, respectively. Axial roller bearings 346G and 346H separate the spherical washers from the hub portion 120A.

Axial bearings are bearings designed to transmit an axial load between two relatively rotatable members. A typical axial bearing will include rollers having an axis of rotation extending radially relative to the axis of rotation of the relatively rotating parts.

The mainshaft 346 is thus supported directly or indirectly at its front end by input shaft 16 while the spherical washer 318D and surface 346C allow for a limited amount of radial movement of the mainshaft relative to the axis of rotation of the input shaft. The mainshaft is supported directly or indirectly at its rear end by the output shaft 358 while spherical washers 346D and 346E interact with tapered surfaces 346F and 358D to allow a limited amount of radial movement of the mainshaft relative to the axis of rotation 358F of the output shaft 358 which is substantially coaxial with axis 318E.

All or substantially all of the gearing of transmission 310 may be helical which may result in the creation of axial forces on the various transmission components. Forward axial forces on the mainshaft 346 and/or on the splitter/range gear 376 will be transferred to the housing through bearings 346G, 318C and/or 318B while rearward axial forces on the mainshaft and splitter/range gear will be transferred to the housing through bearings 346G, 346H and/or 358E.

Accordingly, the mainshaft 346 is supported solely by the input and output shafts, preferably with a limited degree of radial freedom or float, requiring no intermediate support to the housing and, if necessary, allowing the transfer of axial forces associated with helical gearing to the housing through appropriate bearings. Further, by eliminating the necessity of an intermediate support for mainshaft 346, the intermediate wall 214C may be of minimal size.

Details of the structure of input shaft 16, mainshaft 346 and output shaft 358 may be further understood by reference to aforementioned allowed U.S. patent application Ser. Nos. 08/063,829 and 08/063,792, now U.S. Pat. Nos. 5,370,013 and 5,390,561, respectively, the disclosures of which are incorporated herein by reference.

Although the present invention has been described with a certain degree of particularity, it is understood that various changes to form and detail may be made without departing from the spirit and the scope of the invention as hereinafter claimed.

We claim:

1. A compound vehicular change gear transmission (200) comprising a multiple speed main transmission section (212) connected in series with a multiple speed auxiliary transmission section (302), said main and auxiliary transmission sections contained within a common transmission housing (214) defining a forward end wall (214A) and a rearward end wall (214B);

said main transmission section comprising an input shaft (316) supported for rotation in said housing by input shaft bearing means (318B) carried by said forward end wall, at least one input gear (24) fixable to said input shaft, a mainshaft (346) generally coaxial with said input shaft and extending into said auxiliary transmission section, a plurality of substantially identical main section countershafts (324) rotatably supported in said housing and driven by said input shaft, a plurality of main section countershaft gears (38, 40, 42, 44, 46) fixed to each of said main section countershafts, a plurality of mainshaft gears (50, 52, 54, 56) surrounding said mainshaft and constantly meshed with pairs of said main section countershaft gears and main section clutch means (60, 62, 64) carried by said mainshaft for selectively fixing said mainshaft gears to said mainshaft for rotation therewith;

said auxiliary transmission section comprising a plurality of substantially identical auxiliary section countershafts (362) coaxial with said main section countershafts and rotatably supported in said housing, an output shaft (358) generally coaxial with said mainshaft and rotatably supported in said housing by output shaft bearing means (358E) carried by said rearward end wall (214B), an auxiliary section countershaft gear (112, 114, 116) fixed to each of said auxiliary section countershafts, at least one auxiliary section central gear (118, 120, 124) generally coaxial with said output shaft and constantly meshed with a pair of said auxiliary section countershaft gears and auxiliary section clutch means (126, 128) for selectively clutching at least one of said auxiliary section central gears and said mainshaft to said output shaft;

said transmission characterized by:
the coaxial ones of said main section and auxiliary section countershafts being independently rotatable in said housing with bearing means therebetween and together defining a coaxial assembly of countershafts rotatably supported in said housing solely by bearing means (326, 362C) mounted in said forward end wall and in said rearward end wall and a single bearing (324B) mounted in an intermediate (214C) housing wall;
the rearward end of said input shaft is provided with a generally tapered surface for abutting engagement with a generally complimentary tapered surface provided on the forward end of said mainshaft; and
said mainshaft is supported in said housing solely by said input shaft and said output shaft.

2. The compound transmission of claim 1 wherein one of said main transmission section and said auxiliary transmission section countershafts defines a generally tubular portion telescopically surrounding a portion of the other of said main transmission section and auxiliary transmission section countershafts.

3. The compound transmission of claim 1 wherein said mainshaft and said mainshaft gears are radially floatable relative to the axis of rotation of said input shaft and said output shaft.

4. The compound transmission of claim 1 wherein the forward end of said output shaft is provided with a tapered surface for abutting engagement with a generally complimentary tapered surface provided on the rearward end of said mainshaft.

5. The compound transmission of claim 4 wherein the rearward end of said input shaft is provided with a tapered surface for abutment with a generally complimentary tapered surface provided on the forward end of said mainshaft.

6. The compound transmission of claim 1 wherein one of the rearward end of said input shaft and the forward end of said mainshaft define a tapered surface abutting with a generally spherical washer carried by the other of said rearward end of said input shaft and forward end of said mainshaft.

7. The compound transmission of claim 6 wherein said other of said rearward end of said input shaft and the forward end of said mainshaft defines a generally radially extending surface facing the one of said rearward end of said input shaft and forward end of said mainshaft, and further comprising an axial bearing member interposed said surface and a generally radially extending surface on said spherical washer.

8. The compound transmission of claim 6 wherein said spherical washer is made of a bearing steel.

9. The compound transmission of claim 7 wherein said spherical washer is made of a bearing steel.

10. The compound transmission of claim 7 wherein said washer defines a reduced diameter hub extending from said radially extending face, said axial bearing defining an inner diameter surface piloted on the outer diameter surface of said hub.

11. The compound transmission of claim 9 wherein said washer defines a reduced diameter hub extending from said radially extending face, said axial bearing defining an inner diameter surface piloted on the outer diameter surface of said hub.

12. The compound transmission of claim 6 wherein said one of the rearward end of said input shaft and the forward end of said mainshaft is the forward end of said mainshaft and said tapered surface extends radially inwardly and axially rearwardly.

13. The compound transmission of claim 7 wherein said one of the rearward end of said input shaft and the forward end of said mainshaft is the forward end of said mainshaft and said tapered surface extends radially inwardly and axially rearwardly.

14. The compound transmission of claim 2 wherein said auxiliary countershaft is of a generally tubular shape defining a through bore (362D) extending the entire axial length thereof.

15. A compound vehicular change gear transmission (200) comprising a multiple speed main transmission section (212) connected in series with a multiple speed auxiliary transmission section (302), said main and auxiliary transmission sections contained within a common transmission housing (214) defining a forward end wall (214A) and a rearward end wall (214B);

said main transmission section comprising an input shaft (316) supported for rotation in said housing by input shaft bearing means (318B) carried by said forward end wall, at least one input gear (24) fixable to said input shaft, a mainshaft (346) generally coaxial with said input shaft and extending into said auxiliary transmission section, a plurality of substantially identical main section countershafts (324) rotatably supported in said housing and driven by said input shaft, a plurality of main section countershaft gears (38, 40, 42, 44, 46) fixed to each of said main section countershafts, a plurality of mainshaft gears (50, 52, 54, 56) surrounding said mainshaft and constantly meshed with pairs of said main section countershaft gears and main section clutch means (60, 62, 64) carried by said mainshaft for selectively fixing said mainshaft gears to said mainshaft for rotation therewith;

said auxiliary transmission section comprising a plurality of substantially identical auxiliary section countershafts (362) coaxial with said main section countershafts and rotatably supported in said housing, an output shaft (358) generally coaxial with said mainshaft and rotatably supported in said housing by output shaft bearing means (358E) carried by said rearward end wall (214B), an auxiliary section countershaft gear (112, 114, 116) fixed to each of said auxiliary section countershafts, at least one auxiliary section central gear (118, 120, 124) generally coaxial with said output shaft and constantly meshed with a pair of said auxiliary section countershaft gears and auxiliary section clutch means (126, 128) for selectively clutching at least one of said auxiliary section central gears and said mainshaft to said output shaft;

said transmission characterized by:

the coaxial ones of said main section and auxiliary section countershafts being independently rotatable in said housing and together defining a coaxial assembly of countershafts rotatably supported in said housing by bearing means (326, 362C) mounted in said forward end wall and in said rearward end wall and a bearing (324B) mounted in an intermediate (214C) housing wall, one of said main transmission section and said auxiliary transmission section countershafts defining a generally tubular portion telescopically surrounding a portion of the other of said main transmission section and auxiliary transmission section countershafts with bearing means (362B) extending between said portions; and said mainshaft is supported in said housing solely by said input shaft and said output shaft.

16. The compound transmission of claim 15 wherein said auxiliary countershaft is of a generally tubular shape defining a through bore (362D) extending the entire axial length thereof.

17. A compound vehicular change gear transmission (200) comprising a multiple speed main transmission section (212) connected in series with a multiple speed auxiliary transmission section (302), said main and auxiliary transmission sections contained within a common transmission housing (214) defining a forward end wall (214A) and a rearward end wall (214B);

said main transmission section comprising an input shaft (316) supported for rotation in said housing by input shaft bearing means (318B) carried by said forward end wall, at least one input gear (24) fixable to said input shaft, a mainshaft (346) generally coaxial with said input shaft and extending into said auxiliary transmission section, a plurality of substantially identical main section countershafts (324) rotatably supported in said housing and driven by said input shaft, a plurality of main section countershaft gears (38, 40, 42, 44, 46) fixed to each of said main section countershafts, a plurality of mainshaft gears (50, 52, 54, 56) surrounding said mainshaft and constantly meshed with pairs of said main section countershaft gears and main section clutch means (60, 62, 64) carried by said mainshaft for selectively fixing said mainshaft gears to said mainshaft for rotation therewith;

said auxiliary transmission section comprising a plurality of substantially identical auxiliary section countershafts (362) coaxial with said main section countershafts and rotatably supported in said housing, an output shaft (358) generally coaxial with said mainshaft and rotatably supported in said housing by output shaft bearing means (358E) carried by said rearward end wall (214B), an auxiliary section countershaft gear (112, 114, 116) fixed to each of said auxiliary section countershafts, at least one auxiliary section central gear (118, 120, 124) generally coaxial with said output shaft and constantly meshed with a pair of said auxiliary section countershaft gears and auxiliary section clutch means (126, 128) for selectively clutching at least one of said auxiliary section central gears and said mainshaft to said output shaft;

said transmission characterized by:

the coaxial ones of said main section and auxiliary section countershafts being independently rotatable in said housing and together defining a coaxial assembly of countershafts rotatably supported in said housing solely by bearing means in the forward end wall supporting the main section countershaft, in the rearward end wall supporting the auxiliary section countershafts and in an intermediate wall, and said auxiliary transmission section countershafts being of a generally tubular shape defining a through bore (362D) extending the entire axial length thereof and including a forward portion telescopically surrounding a rearward portion of said main transmission section countershafts with bearing means extending between said portions.

18. The compound transmission of claim 17 wherein the rearward end of at least one of said main section countershafts includes a driving socket aligned with said through bore.

19. A compound vehicular change gear transmission comprising a multiple speed main transmission section connected in series with a multiple speed auxiliary transmission section, said main and auxiliary transmission sections contained within a common transmission housing defining a forward end wall and a rearward end wall;

said main transmission section comprising an input shaft supported for rotation in said housing by input shaft bearing means carried by said forward end wall, at least one input gear fixable to said input shaft, a mainshaft generally coaxial with said input shaft and extending into said auxiliary transmission section, a plurality of substantially identical main section countershafts rotatably supported in said housing and driven by said input shaft, a plurality of main section countershaft gears fixed to each of said main section countershafts, a plurality of mainshaft gears surrounding said mainshaft and constantly meshed with pairs of said main section countershaft gears and main section clutch means carried by said mainshaft for selectively fixing said mainshaft gears to said mainshaft for rotation therewith;

said auxiliary transmission section comprising a plurality of substantially identical auxiliary section countershafts coaxial with said main section countershafts and rotatably supported in said housing, an output shaft generally coaxial with said mainshaft and rotatably supported in said housing by output shaft bearing means carried by said rearward end wall, an auxiliary section countershaft gear fixed to each of said auxiliary section countershafts, at least one auxiliary section central gear generally coaxial with said output shaft and constantly meshed with a pair of said auxiliary section countershaft gears and auxiliary section clutch means for selectively clutching at least one of said auxiliary section central gears and said mainshaft to said output shaft;

said transmission characterized by:

the coaxial ones of said main section and auxiliary section countershafts being independently rotatable in said housing with bearing means (362B) extending therebetween and together defining a coaxial assembly of countershafts rotatably supported in said housing solely by bearing means mounted in said forward end wall and in said rearward end wall and a single bearing mounted in an intermediate housing wall; and said mainshaft is supported in said housing solely by said input shaft and said output shaft.

\* \* \* \* \*